Patented Nov. 29, 1927.

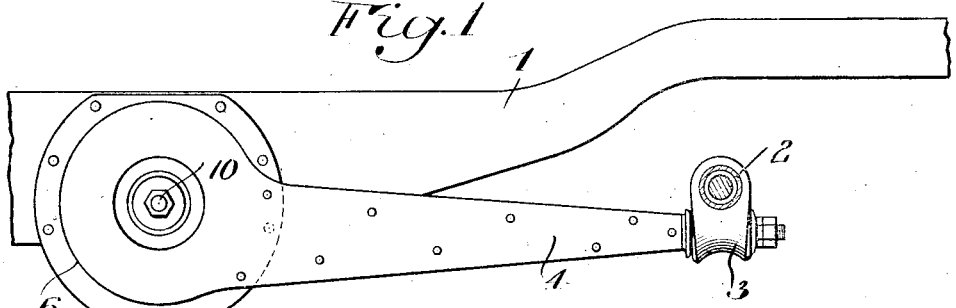
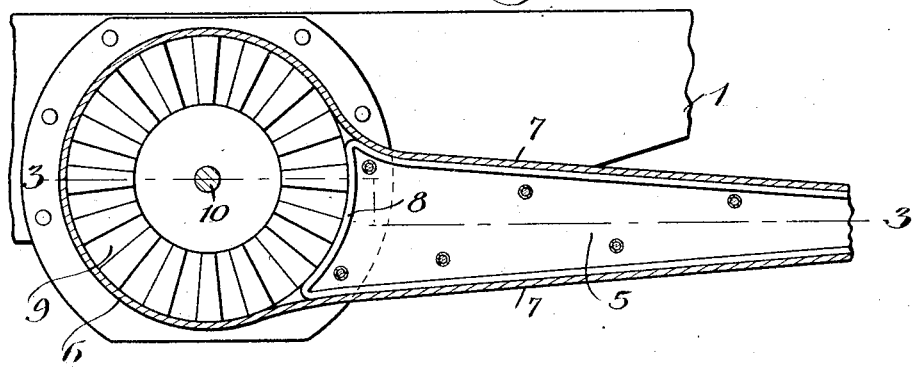
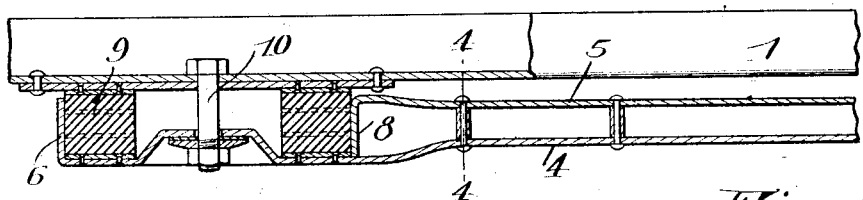
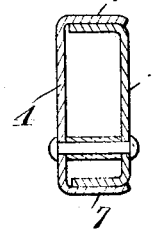
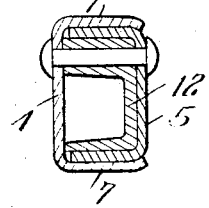
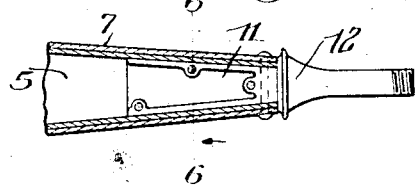

1,651,281

UNITED STATES PATENT OFFICE.

HARMON J. KLINE, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed March 13, 1926. Serial No. 94,573.

This invention relates to a motor vehicle, and more particularly to the construction of a connecting arm such as is employed in the type of suspension illustrated in Patent No. 1,515,716, November 18, 1924, where the arm has one end connected to an axle and its opposite end connected to a motor vehicle frame through a rubber block that is clamped between and has groove and rib connection with the frame and arm respectively.

The object of the invention is to provide a simplified and practicable construction for the connecting arm, making it possible to manufacture it economically on a commercial scale.

In a more specific aspect, the invention has for its object to afford an arrangement that permits of stamping from sheet metal a connecting arm that is characterized by the necessary stiffness and strength to withstand the strains and pressure imposed on it.

With these ends in view, the invention consists in the construction and arrangement of parts that will appear from the following description when read in conjunction with the accompanying drawing, the novel features being pointed out in the claims following the description.

In the drawing:

Figure 1 is a side elevation illustrating a preferred embodiment of the invention as applied to a motor vehicle frame and axle, and forming part of a suspension similar to that of the patented construction hereinbefore referred to;

Figure 2 is a longitudinal vertical sectional view, with parts broken away, taken centrally through the connecting arm;

Figure 3 is a horizontal sectional view on line 3—3 of Figure 2;

Figure 4 is a transverse vertical sectional view on line 4—4 of Figure 3;

Figure 5 is a longitudinal sectional view of the outer end of the connecting arm, showing the axle bracket held thereby, and Figure 6 is a sectional view on line 6—6 of Figure 5.

Referring more particularly to the drawing, in which like reference characters refer to the same parts throughout the several views, 1 designates the side member of a motor vehicle frame of conventional type, and 2 is the rear axle provided with a boss 3 having a bearing for flexible connection with the outer end of the arm which is constructed in the following manner.

The connecting arm consists of two sheet metal sections designated at 4 and 5 respectively. Said sections 4 and 5 are both U-shaped in cross-section and secured one within the other in inverted relationship, as shown in Figure 4. In order to provide a circular housing for the rubber block used in the type of suspension hereinbefore mentioned, the outer section 4 has a curved wall 6 at one end and the inner section 5 has a curved wall 8 at one end. The curved end walls 6 and 8 are arranged opposite to each other and together form a circular housing for the rubber block 9, the end wall 8 conforming to the circle of end wall 6 and being arranged between the side walls 7. It will be understood that the rubber block 9 has ribs and grooves therein for cooperation with corresponding ribs and grooves on the housing and on the frame, in the manner shown in the patent above referred to. The sections 4 and 5 are suitably riveted together and the arm is held in clamping relation with the rubber block 9 by the center pin 10 and its retaining nut, after the fashion of the patented structure already mentioned.

The connecting arm is united with the axle through a bracket which has a U-shaped inner end 11, preferably tapering, and located within the sections 4 and 5, as shown in Figures 5 and 6, the bracket being rigidly secured to the arm by rivets passing through the sections of the connecting arm and the inner end 11 of the bracket. 12 is the outer end of the bracket which is adapted for flexible connection with a suitable bearing in the axle. It will be understood that the connecting arm may be united with the axle either rigidly or flexibly, and through other means than the bracket just described, which is illustrative of a preferred arrangement that lends itself to a practicable yielding union with the axle.

While the invention has been described with reference to a certain structural embodiment, it is not restricted to the precise details or arrangement shown, and this application is intended to cover such modifications or departures as may come within the spirit of the invention or the scope of the following claims.

I claim:

1. In a motor vehicle, the combination with a frame and axle, of a hollow, stamped metal arm connected at one end to the frame and at its opposite end to the axle, said arm consisting of two sections of U-shaped cross-section secured one within the other and having curved walls at one end, one opposite to the other, and together forming a circular housing, and a rubber block disposed in the housing and having groove and rib connection with the frame and arm.

2. In a motor vehicle, the combination with a frame and axle, of a hollow, stamped metal arm connected at one end to the frame and at its opposite end to the axle, said arm consisting of two sections of U-shaped cross-section secured one within the other and having curved walls at one end, one opposite to the other, and together forming a circular housing, a rubber block disposed in said housing and having groove and rib connection with the frame and arm, and a bracket secured within the opposite end of the arm and provided with an end portion attachable to the axle.

3. In a motor vehicle, a connection arm comprising two members of U-shaped cross-section secured one within the other, the outer member terminating in a curved end wall, the inner member also terminating in a curved end wall extending between the adjacent walls of the outer member and co-operating with said curved end wall of the outer member to form a housing of substantially circular outline.

In witness whereof, I have hereunto signed my name.

HARMON J. KLINE.